US007680080B2

(12) United States Patent
Zeira et al.

(10) Patent No.: US 7,680,080 B2
(45) Date of Patent: Mar. 16, 2010

(54) METHOD OF USING A MOBILE UNIT TO DETERMINE WHETHER TO COMMENCE HANDOVER

(75) Inventors: Eldad Zeira, Huntington, NY (US); Ariela Zeira, Huntington, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 867 days.

(21) Appl. No.: 10/966,449

(22) Filed: Oct. 15, 2004

(65) Prior Publication Data

US 2005/0047354 A1 Mar. 3, 2005

Related U.S. Application Data

(63) Continuation of application No. 10/216,120, filed on Aug. 9, 2002, now Pat. No. 7,068,626.

(60) Provisional application No. 60/312,821, filed on Aug. 16, 2001.

(51) Int. Cl.
*H04Q 7/22* (2006.01)
(52) U.S. Cl. ...................................................... 370/332
(58) Field of Classification Search ................. 370/280, 370/294, 331, 332, 345, 277; 455/436, 437, 455/439, 560
See application file for complete search history.

(56) References Cited

U.S. PATENT DOCUMENTS 5,159,593 A     10/1992   D'Amico et al.
5,752,190 A      5/1998   Kaewell et al.
5,950,125 A *    9/1999   Buhrmann et al. ....... 455/432.1
6,041,235 A      3/2000   Aalto
6,108,546 A      8/2000   Kusaki et al.
6,144,861 A     11/2000   Sundelin et al.

(Continued)

FOREIGN PATENT DOCUMENTS

WO            96/38997           12/1996

(Continued)

OTHER PUBLICATIONS

"21-Bit Channel Link", National Semiconductor, Jul. 1997, http://www.national.com/ds/DS/DS90CR21.pdf.

(Continued)

*Primary Examiner*—Dmitry H Levitan
(74) *Attorney, Agent, or Firm*—Volpe and Koenig, P.C.

(57) ABSTRACT

A method of using a mobile unit in a multi-cell communication system to determine whether to commence handover of the mobile unit from a serving base station located in a first cell of the communication system to a target base station located in a second cell of the communication system. The mobile unit determines the serving base station received signal code power ($RSCP_{ser}$), the first cell interference signal code power ($ISCP_{ser}$), the target base station received signal code power ($RSCP_{tar}$) and the second cell interference signal code power ($ISCP_{tar}$). If the ratio $RSCP_{ser}/ISCP_{ser}$ is less than the ratio $RSCP_{tar}/ISCP_{tar}$, the mobile unit commences handover to the target base station. The multi-cell communication system may be a time division duplex (TDD) system. The mobile unit may send a message to a radio network controller (RNC) in communication with the serving and target base stations to initiate the handover.

4 Claims, 3 Drawing Sheets

U.S. PATENT DOCUMENTS

| | | | |
|---|---|---|---|
| 6,148,207 | A | 11/2000 | Baum et al. |
| 6,192,245 | B1 | 2/2001 | Jones et al. |
| 6,337,983 | B1 * | 1/2002 | Bonta et al. ................ 455/437 |
| 6,363,252 | B1 | 3/2002 | Hamalainen et al. |

FOREIGN PATENT DOCUMENTS

| | | |
|---|---|---|
| WO | 99/14972 | 3/1999 |
| WO | WO 99/14972 | 3/1999 |
| WO | 99/59368 | 11/1999 |
| WO | 01/52582 | 7/2001 |

OTHER PUBLICATIONS

Novak et al., "Channel Link Moving and Shaping Information in Point-To-Point Application", National Semiconductor, May 1996, http://www.national.com/an/AN/AN-1041.pdf.

von Herzen et al., "Multi-Chanel 622 Mb/s LVDS Data Transfer for Virtex-E Devices", Xilinx Inc., Jan. 6, 2001, http://direct.xilinx.com/bvdocs/appnotes/xapp233.pdl.

* cited by examiner

METHOD OF USING A MOBILE UNIT TO DETERMINE WHETHER TO COMMENCE HANDOVER

CROSS REFERENCE TO RELATED APPLICATION

This application is a continuation of U.S. patent application Ser. No. 10/216,120 filed Aug. 9, 2002, which in turn claims priority from U.S. Provisional Patent Application Ser. No. 60/312,821 filed Aug. 16, 2001, which is incorporated by reference as if fully set forth.

BACKGROUND

The present invention generally relates to code division multiple access (CDMA) communication systems employing time division duplex (TDD). More specifically, the present invention is a TDD system which implements a novel method for handing over a mobile terminal between two base stations.

Figure 1:
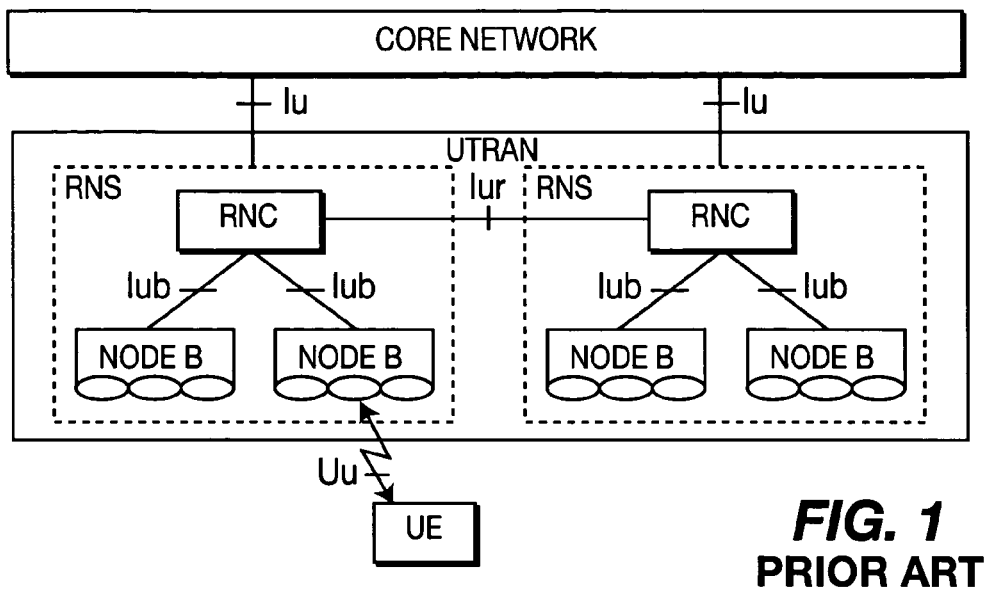

A Universal Mobile Telecommunications System (UMTS) network architecture as shown in FIG. 1 includes a core network (CN), a UMTS Terrestrial Radio Access Network (UTRAN) and a User Equipment (UE). The two general interfaces are the Iu interface, which is coupled between the UTRAN and the core network, and the radio interface Uu, which is coupled between the UTRAN and the UE. The UTRAN consists of several Radio Network Subsystems (RNS). They can be interconnected by the Iur interface. This interconnection allows core network independent procedures between different RNSs. The RNS is further divided into the Radio Network Controller (RNC) and several base stations (Node-Bs). The base stations are connected to the RNC by the Iub interface. One base station can serve one or multiple cells, and typically serves a plurality of UEs. Although the UTRAN supports both FDD mode and TDD mode on the radio interface, the present invention is related only to the TDD mode.

Figure 2:
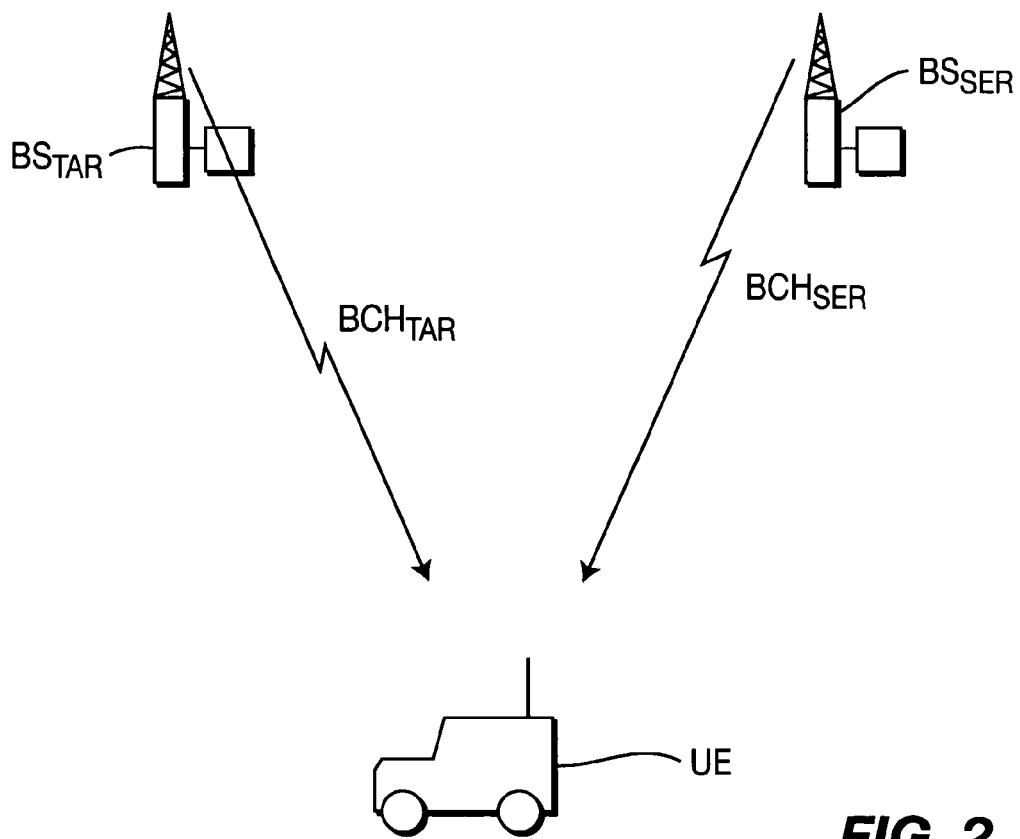

In the current UMTS TDD systems, the sole criterion for handover, whether intra- or inter-frequency, is the path loss difference between the present base station, (i.e. the "serving" base station), and a target base station. This situation is shown in FIG. 2. The mobile user equipment (UE) is shown receiving signals from two base stations: 1) the serving base station $BS_{ser}$; and 2) the target base station $BS_{tar}$. The UE receives the physical channel that carries the broadcast channel $BCH_{ser}$ from the serving base station $BS_{ser}$ and the physical channel that carries the broadcast channel $BCH_{tar}$ from the target base station $BS_{tar}$. The UE measures the strength of the channels $BCH_{ser}$, $BCH_{tar}$. When the $BCH_{tar}$ from the target cell is sufficiently stronger than the channel $BCH_{ser}$ from the serving cell, the measurements are transmitted to the RNC, which determines whether or not to initiate a handover. Alternatively, measurements can periodically be signaled to the RNC for the purpose.

Figure 3:
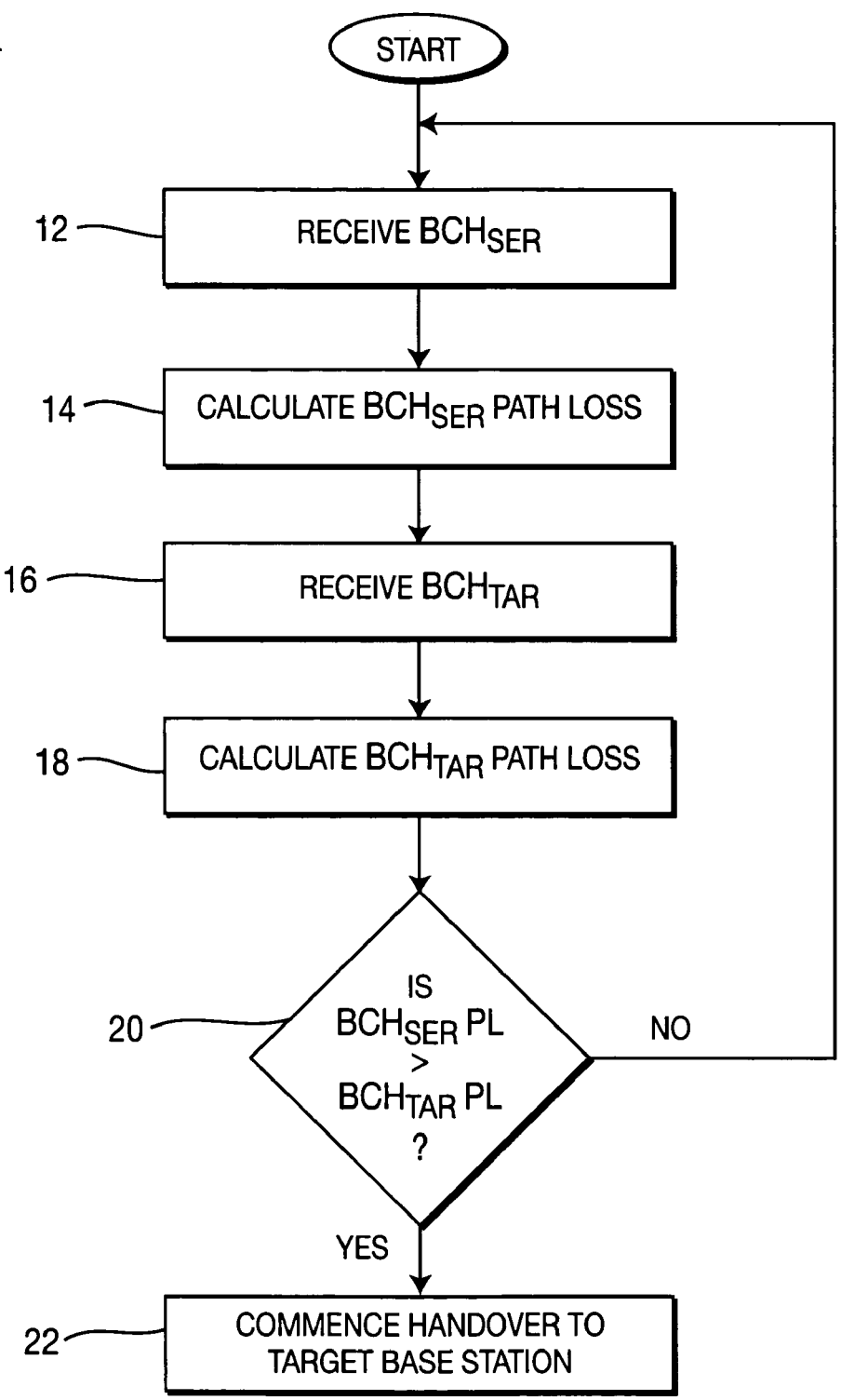

The current procedure 10 carried out by a prior art UMTS TDD communication system for determining whether to commence handover can be generally explained with reference to FIG. 3. The UE receives the physical channel that carries the broadcast channel ($BCH_{ser}$) from the serving base station $BS_{ser}$ (step 12) and calculates its strength. The UE also receives the physical channel that carries the broadcast channel ($BCH_{tar}$) from the target base station $BS_{tar}$ (step 16) and also calculates its strength. Periodically, or depending on the relative signal strengths, the information is signaled to the RNC which determines the $BCH_{ser}$ path loss (step 14) and the $BCH_{tar}$ path loss (step 18).

It is then determined whether the $BCH_{ser}$ path loss is greater than the $BCH_{tar}$ pathloss (step 20). If it is not, no further action is taken. If, however, the $BCH_{ser}$ path loss is greater than the $BCH_{tar}$ path loss as determined by step 20, the handover to the target base station $BS_{tar}$ (step 22) is typically commenced.

Typically, the values measured at steps 12 and 16 are transmitted to the RNC, and steps 14, 18 and 20 are performed at the RNC.

Although this example illustrates a single target cell, the same is true for a multiple of target cells of which the UE is aware, either by detecting their presence or by having received their parameters from the serving cell.

In TDD systems that use multi-user detecting (MUD) receivers, the interference measured in the serving cell is different from other cells. A prerequisite to receiving data in any cell is the ability to decode the BCH channel in the cell. Due to the low spreading factor used in TDD this may be difficult, particularly at cell edge. Therefore it would be desirable to ensure that BCH reception is possible in the target cell prior to the handover.

In addition to the path loss, BCH reception depends on the interference in the slot and prior knowledge of its level is necessary to determine its likelihood. This is particularly true in small cells where the interference level is typically higher, and the interference is also different from cell to cell and UE to UE. Observing the interference in the serving cell will typically provide no information about the interference in the target cell because in the case of a MUD receiver, different slots or different frequencies may be used. Thus it would be desirable to measure the interference in the slot which carries the BCH in the target cell.

SUMMARY

The present invention is a method of using a mobile unit in a multi-cell communication system to determine whether to commence handover of the mobile unit from a serving base station located in a first cell of the communication system to a target base station located in a second cell of the communication system. The mobile unit determines the serving base station received signal code power ($RSCP_{ser}$), the first cell interference signal code power ($ISCP_{ser}$), the target base station received signal code power ($RSCP_{tar}$) and the second cell interference signal code power ($ISCP_{tar}$). If the ratio $RSCP_{ser}/ISCP_{ser}$ is less than the ratio $RSCP_{tar}/ISCP_{tar}$, the mobile unit commences handover to the target base station. The multi-cell communication system may be a time division duplex (TDD) system. The mobile unit may send a message to a radio network controller (RNC) in communication with the serving and target base stations to initiate the handover.

The system utilizes a new criteria and method for initiating handover between cells. The system measures the downlink interference in the BCH timeslot, and utilizes this interference in conjunction with the signal strength as criterion for the handover decision. The new criterion may be used instead of, or in addition to, existing criteria.

Accordingly, the ratio of the signal strength of the BCH to the interference in the timeslot may be used to make the handover decision. In one embodiment of the present invention, the signal strength is used in macro cells where interference is relatively predictable and BCH reception is easy. The ratio of signal strength to the interference may be used in pico cells and micro cells.

An advantage of using both signal strength and interference measured in the same slot as handover criterion is the inherent inaccuracy of each of the measurements that results from a use of an inaccurate automatic gain control (AGC) circuit. As both signal level and interference are determined at once, their ratio is more accurate than each alone.

BRIEF DESCRIPTION OF THE DRAWING(S)

Figure 4:
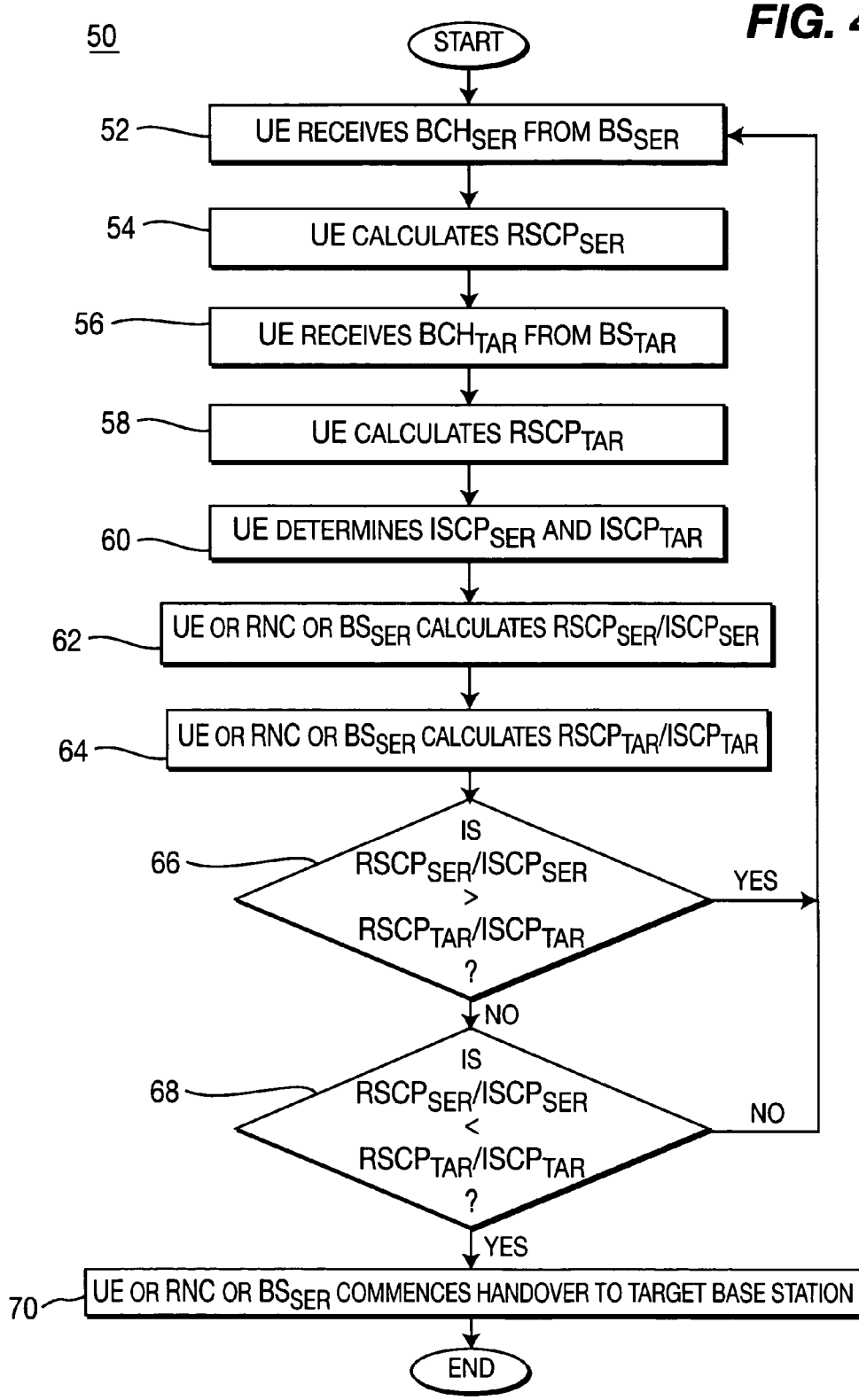

FIG. 1 is a prior art UTMS system.
FIG. 2 is a prior art UE receiving the broadcast channel from two base stations.
FIG. 3 is the procedure carried out by a prior art UMTS TDD communication system for determining whether to commence handover.
FIG. 4 is a method for determining whether to institute handover in accordance with the present invention.

DETAILED DESCRIPTION OF THE PREFERRED EMBODIMENT(S)

The present invention will be described with reference to the drawing figures where like numerals represent like elements throughout.

In the following detailed description RSCP refers to the downlink (DL) reception strength of the broadcast channel (BCH), which is a measure of the path loss. ISCP refers to the DL interference in the same slot as observed by the UE receiver.

In some operating states the mobile decides autonomously on its serving cell, called autonomous cell selection. The present invention applies to both network controlled handover and autonomous cell selection.

Referring to the flow diagram of FIG. 4, a method 50 including steps for determining whether to institute handover in accordance with the present invention is shown. The UE first receives the broadcast channel ($BCH_{ser}$) from the serving base station $BS_{ser}$ (step 52) and calculates the serving base station $RSCP_{ser}$ (step 54). The UE also receives the broadcast channel $BCH_{tar}$ from the target base station $BS_{tar}$ (step 56) and calculates the target base station $RSCP_{tar}$ (step 58). The ISCP is then determined for both cells $ISCP_{ser}$, $ISCP_{tar}$ (step 60). It should be noted that separate ISCP measurements are needed even if both cells share the same carrier and slot. The $RSCP_{ser}/ISCP_{ser}$ for the serving base station $BS_{ser}$ is calculated (step 62), and the $RSCP_{tar}/ISCP_{tar}$ for the target base station is calculated (step 64). If the $RSCP_{ser}/ISCP_{ser}$ for the serving base station $BS_{ser}$ is greater than the $RSCP_{tar}/ISCP_{tar}$ for the target base station $BS_{tar}$ (step 66), then the UE maintains communications with the serving base station $BS_{ser}$. If, however, the $RSCP_{ser}/ISCP_{ser}$ for the serving base station $BS_{ser}$ is less than the $RSCP_{tar}/ISCP_{tar}$ for the target base station $BS_{tar}$ (step 68), the procedure for handing over to the target base station $BS_{tar}$ (step 70) is commenced.

It should be noted that steps 62, 64, 66, 68 and 70 may be performed at the RNC or the serving base station $BS_{ser}$. In that case, the UE would forward the ISCP and RSCP measurements to the RNC or serving base station $BS_{ser}$, which would then perform the calculation steps 62 and 64, comparison steps 66 and 68, and the remaining step 70 of commencing handover to the target base station $BS_{tar}$. Alternatively, the UE may perform steps 62, 64, 66 and 68, and step 70 would comprise sending a message to the RNC to initiate handover in accordance with prior art handover methods. It is intended that the present invention operate with either the UE, RNC or serving base station $BS_{ser}$ performing steps 62, 64, 66, 68 and 70.

It should be noted that there are many different types of handover procedures that can be used in accordance with the present invention, and it is beyond the scope of the present invention to provide a detailed explanation of such procedures. However, the present invention provides a new "prehandover" method for evaluating whether or not to commence handover.

It should be noted that this method applies to serving and target BCHs which are either in the same or different timeslots, or the same or different frequencies.

What is claimed is:

1. A method to determine whether to commence handover, the method comprising a mobile unit:
   receiving a first broadcast channel from a serving base station;
   determining the serving base station received signal code power ($RSCP_{ser}$) based on the first broadcast channel;
   receiving a second broadcast channel from a target base station;
   determining the target base station received signal code power ($RSCP_{tar}$) based on the second broadcast channel;
   determining if a first cell is a pico cell or a micro cell;
   determining the interference signal code power ($ISCP_{ser}$) of the first cell in which the serving base station operates;
   determining if a second cell is a pico cell or a micro cell;
   determining the interference signal code power ($ISCP_{tar}$) of the second cell in which the target base station operates;
   determining a first signal code power ratio ($RSCP_{ser}/ISCP_{ser}$) for the serving base station by dividing the serving base station received signal code power ($RSCP_{ser}$) by the first cell interference signal code power ($ISCP_{ser}$);
   determining a second signal code power ratio ($RSCP_{tar}/ISCP_{tar}$) for the target base station by dividing the target base station received signal code power ($RSCP_{tar}$) by the second cell interference signal code power ($ISCP_{tar}$);
   comparing the first signal code power ratio with the second signal code power ratio; and
   autonomously deciding to commence handover from the serving base station to the target base station, if the value of the first signal code power ratio determined by the mobile unit is less than the value of the second signal code power ratio determined by the mobile unit.

2. The method of claim 1 further comprising sending a message to at least one radio network controller (RNC) to initiate the handover, the RNC being in communication with the serving base station and the target base station.

3. A method performed by a mobile unit to determine whether to commence handover, the method comprising a mobile unit;
   determining if a first cell is a pico cell or a micro cell;
   determining the serving base station received signal code power ($RSCP_{ser}$) and the first cell interference signal code power ($ISCP_{ser}$);
   determining if a second cell is a pico cell or a micro cell;
   determining the target base station received signal code power ($RSCP_{tar}$) and the second cell interference signal code power ($ISCP_{tar}$);
   determining a first signal code power ratio ($RSCP_{ser}/ISCP_{ser}$) for the serving base station by dividing the serving base station received signal code power ($RSCP_{ser}$) by the first cell interference signal code power ($ISCP_{ser}$);
   determining a second signal code power ratio ($RSCP_{tar}/ISCP_{tar}$) for the target base station by dividing the target base station received signal code power ($RSCP_{tar}$) by the second cell interference signal code power ($ISCP_{tar}$);

comparing the first signal code power ratio with the second signal code power ratio; and autonomously deciding to commence handover to the target base station, if the value of the first signal code power ratio determined by the mobile unit is less than the value of the second signal code power ratio determined by the mobile unit.

4. The method of claim 3 further comprising sending a message to at least one radio network controller (RNC) to initiate the handover, the RNC being in communication with the serving base station and the target base station.

* * * * *